United States Patent [19]

Lucek et al.

[11] 4,214,138

[45] Jul. 22, 1980

[54] VAPOR SHIELD SUPPORT RING FOR A VACUUM INTERRUPTER

[75] Inventors: John R. Lucek, Cheshire; David L. McCall, Dalton, both of Mass.

[73] Assignee: General Electric Company, New York, N.Y.

[21] Appl. No.: 884,617

[22] Filed: Mar. 8, 1978

[51] Int. Cl.[2] ........................ H01H 9/02; C03B 19/04; C03C 27/00; H01H 33/00

[52] U.S. Cl. ................................................ 200/144 B

[58] Field of Search ................ 200/144 B, 304; 65/49, 65/59 R, 71, 154-156, 302, 303; 228/903; 428/35, 65, 66; 313/239, 242, 254, 313; 220/21 R, 2.3 R; 29/622, 613

[56] References Cited

U.S. PATENT DOCUMENTS

| | | | |
|---|---|---|---|
| 2,745,981 | 5/1956 | Sanabria et al. | 200/144 B X |
| 3,048,681 | 8/1962 | Polinko, Jr. | 200/144 B |
| 3,376,186 | 4/1968 | Douillard et al. | 200/144 B |
| 3,783,094 | 1/1974 | Baum | 65/302 X |
| 4,009,999 | 1/1977 | Lucek et al. | 65/49 |
| 4,063,991 | 12/1977 | Farrall et al. | 200/144 B X |
| 4,158,911 | 6/1979 | Polinko, Jr. et al. | 200/144 B X |

*Primary Examiner*—James R. Scott
*Attorney, Agent, or Firm*—Francis X. Doyle; Richard A. Menelly

[57] ABSTRACT

A vacuum shield support ring for a high voltage vacuum interrupter contains a plurality of quasi rectangular openings equidistantly spaced around the ring to allow for the upward flow of glass during the vacuum interrupter envelope forming process. Complete embedment of the openings substantially reduces the occurrence of ionized particles in the finished vacuum interrupter.

13 Claims, 9 Drawing Figures

Fig. 4.
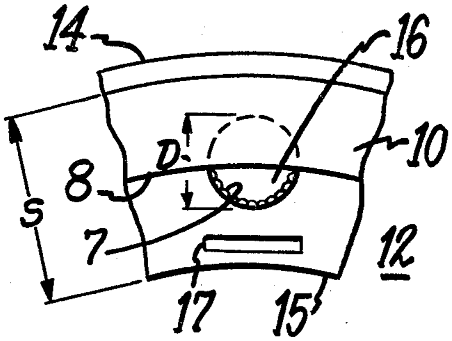
PRIOR ART
Fig. 7.
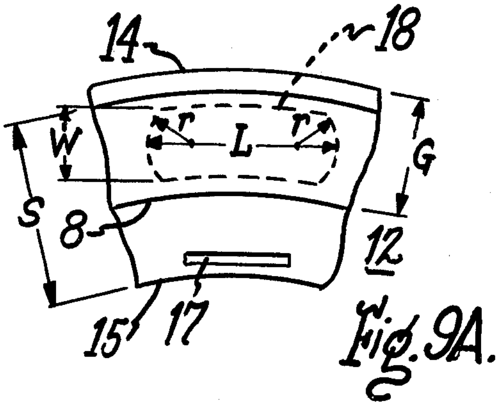
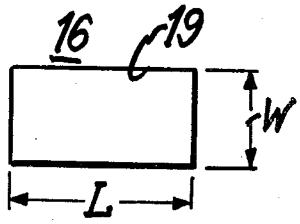
Fig. 9A.
Fig. 8.
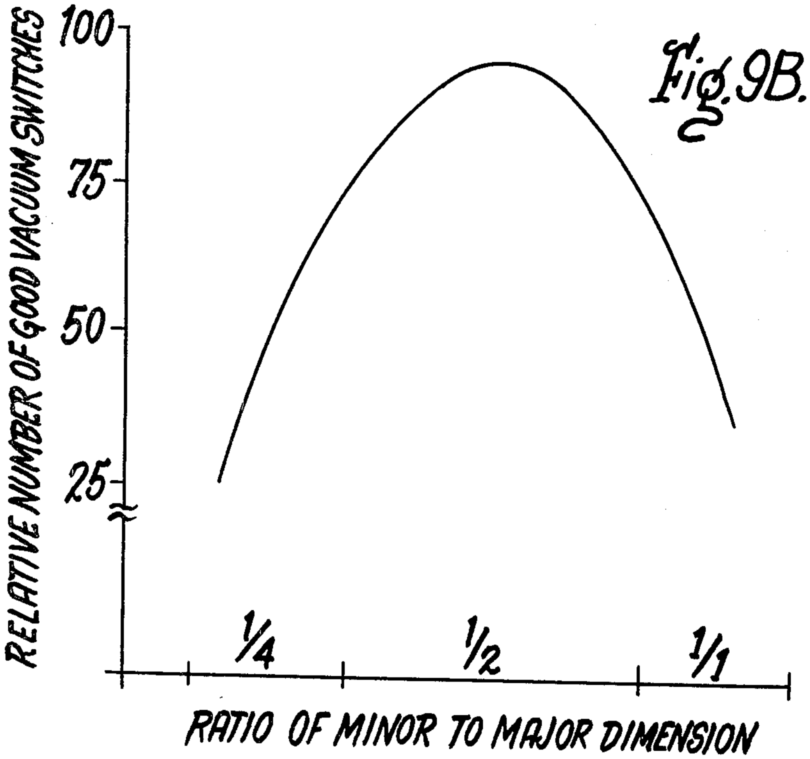
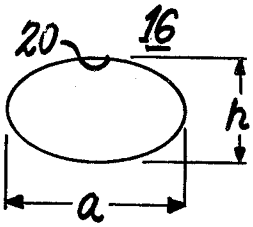
Fig. 9B.

VAPOR SHIELD SUPPORT RING FOR A VACUUM INTERRUPTER

BACKGROUND OF THE INVENTION

This invention relates to high voltage vacuum interrupters of the type containing a shield within an evacuated glass envelope for preventing metallic vapors from condensing on the inner surface of the envelope.

The shield is mounted within the envelope by means of support ring mounted within the glass envelope. One arrangement for mounting the support ring consists of inserting the rim of the ring within annular recesses formed on the inner surface of the glass envelope. U.S. Pat. No. 3,048,682 discloses one method of providing annular recesses on the inner surface of the glass envelope.

U.S. Pat. No. 3,376,186 discloses a shield support ring assembly wherein the ring is embedded within the glass envelope by a centrifugal casting operation. U.S. Pat. No. 4,000,999 discloses a further method for forming a shield support ring within the glass envelope. U.S. Pat. No. 4,158,911 discloses a method for manufacturing a vacuum tight circuit interrupter which includes the step of vibrating the interrupter sub assembly to remove loose glass particles.

One of the problems inherent with embedding the shield support ring within the glass envelope is the occurrence of ionizable particles within the evacuated container. The particles reduce the dielectric strength of the electrode gap and cause the vacuum switch to become conductive below the design voltage. A major source of the ionizable particles has been traced to glass which has loosely adhered to the inner wall of openings in the shield support ring. Various methods for removing the glass prior to evacuation have heretofore proved ineffective.

The purpose of this invention is to eliminate the source of ionizable glass particles from shield support rings embedded within high voltage vacuum interrupter envelopes.

SUMMARY OF THE INVENTION

The invention comprises a vapor shield support ring for high voltage vacuum interrupters having a plurality of quasi rectangular slots for permitting the passage of molten glass during the envelope forming process. The invention further comprises the method of complete encapsulation of the rectangular slots during the formation of the glass envelope to eliminate the formation of narrow apertures on whose walls loosely held glass particles can form.

BRIEF DESCRIPTION OF THE DRAWINGS

FIG. 4 is an enlarged plan view of a part of the configuration of FIG. 3;

FIG. 7 is an enlarged plan view of a part of the configuration of FIG. 6;

FIG. 8 is a graphic representation of the relationship between the number of good vacuum switches resulting as a function of the ratio of the minor to major dimension of the slot within the shield support ring of the invention, and FIG. 9A and FIG. 9B are schematic representations of two configurations of the major and minor dimensions of the slot within the support ring of FIG. 5.

GENERAL DESCRIPTION OF THE PRIOR ART

Figure 1:
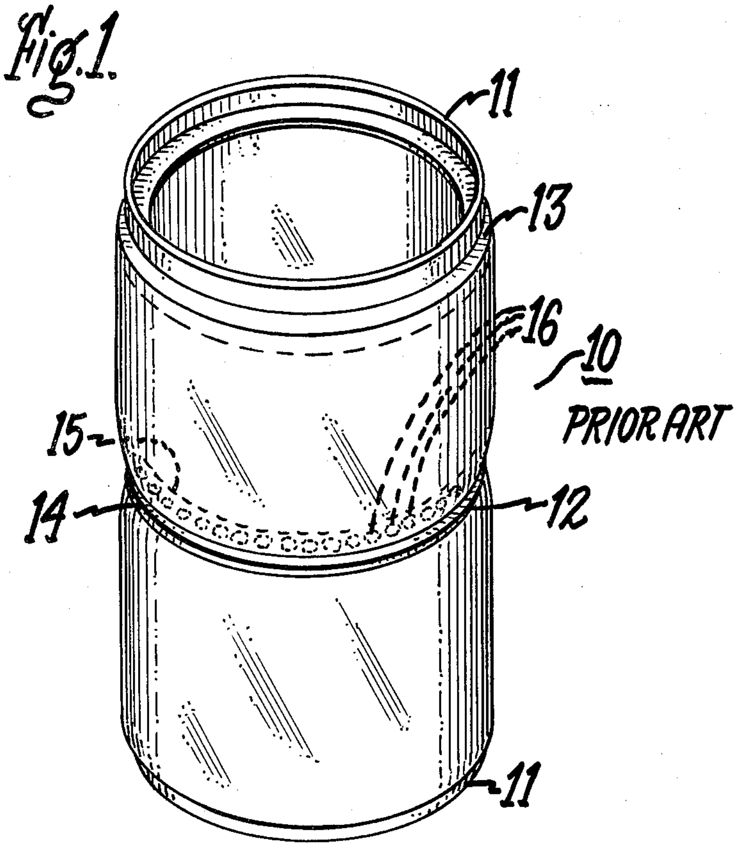
FIG. 1 is a front perspective view of a prior art high voltage vacuum switch envelope.

One type of a high voltage vacuum switch (also called interrupter) can be seen by referring to FIG. 1 where a glass envelope 10 contains a flange 11 at each end and one or more vapor shield support rings 12 intermediate the ends. The vapor shield supporting ring 12 is embedded within the envelope 10 by a method of centrifugal glass casting where the glass material passes through a plurality of apertures 16 called "ports" and wherein the outer perimeter 14 extends outside the glass envelope 10 and the inner perimeter 15 extends within the interior portion of the glass envelope 10. The inner perimeter 15 serves to support the shield assembly for the purposes described earlier. The top flange 11 can be seen to extend above the rim 13 of the glass envelope 10 and serves to connect with an electrode mounting assembly.

Figure 2:
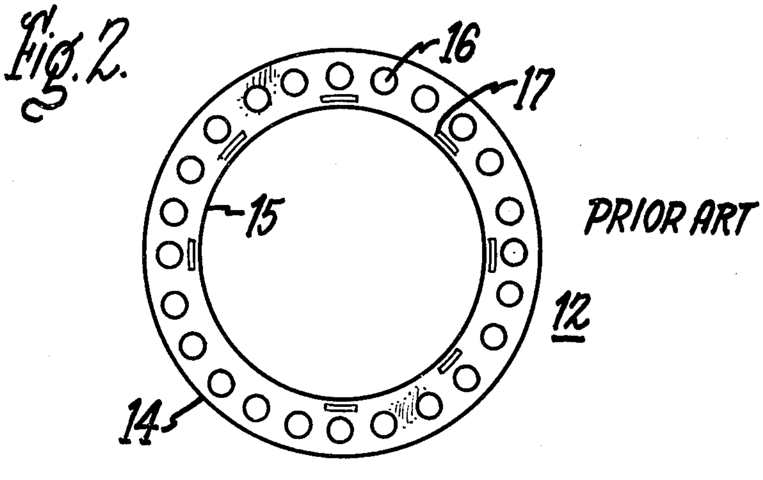
FIG. 2 is a plan view of a prior art shield support ring for use with the vacuum switch envelope of FIG. 1.

The vapor shield support ring 12 is shown in FIG. 2 to consist of a plurality of circular apertures 16 proximate the outer perimeter 14 and a lesser number of slots 17 proximate the inner perimeter 15. The apertures 16 serve to provide a transit path for the molten glass during the centrifugal casting procedure employed in the formation of the glass envelope 10. The molten glass passes from a bottom section of a glass forming mold through the apertures 16 to a top portion of the mold. The slots 17 serve to position and to support the vapor shield assembly when the glass envelope 10 is processed into a vacuum interrupter.

Figure 3:
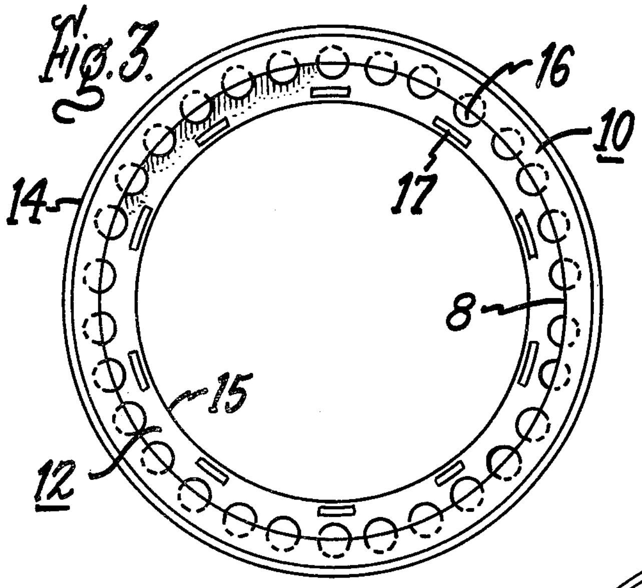
FIG. 3 is a plan view of the shield support ring of FIG. 2 sealed within the vacuum switch envelope of FIG. 1.

The shield support ring 12 is shown formed within the glass envelope 10 in FIG. 3. The ring 12 is formed within the glass envelope 10 in such a manner that the inner perimeter 15 extends within the envelope 10 and the slots 17 proximate the inner perimeter 15 project within the envelope 10 for providing support to the vapor shield assembly as discussed earlier. The outer perimeter 14 extends beyond the envelope 10 and serves as an electrical connection means for the vapor shield assembly. The port apertures 16 are partially embedded within the envelope 10 and partially extend within the inner surface 8 of the envelope 10. During the casting process wherein molten glass transports through apertures 16 some molten glass adheres to the inner surface of the apertures.

The glass is partially removed by means of a grit blasting technique after sealing the ring 12 to envelope 10. It has since been discovered that the extremely thin brittle layer of glass remaining on the inner surface of the apertures becomes displaced upon continued operation of the vacuum switch. The extremely small particles of glass within the evacuated envelope 10 become ionized during the switching operation and reduce the voltage at which the vacuum interrupter operates. FIG. 4 is an enlarged view of one aperture 16 on a ring shield 12 sealed within glass envelope 10. The outer ring perimeter 14 extends beyond the glass envelope as described earlier, and the inner perimeter carrying the shield assembly slot 17 extends within the envelope inner surface 8. The aperture 16 having a diameter D is only partially covered by the material of the glass envelope 10 and is also partially exposed. A thin layer of excess glass 7 remains even after a careful grit blasting removal procedure and becomes a source of contamination within the sealed vacuum interrupter. Since the shield ring 12 is integrally embedded within the glass envelope 10 during the casting process the aperture diameter D must be of sufficient size to ensure that a desired quantity of molten glass can pass through the apertures during the glass forming process. It has hence been discovered that for a given width S of ring shield 12 the opening of aperture 16 is critical. If the diameter D is decreased in size an insufficient rate of flow of glass results during the envelope forming process. Increasing the number of apertures 16 and decreasing the aperture diameter D has not heretofore been successful in an attempt to embed the apertures completely within the glass envelope without seriously effecting the seal existing between flange 11, shield 12 and glass envelope 10.

DESCRIPTION OF THE PREFERRED EMBODIMENT

Figure 6:
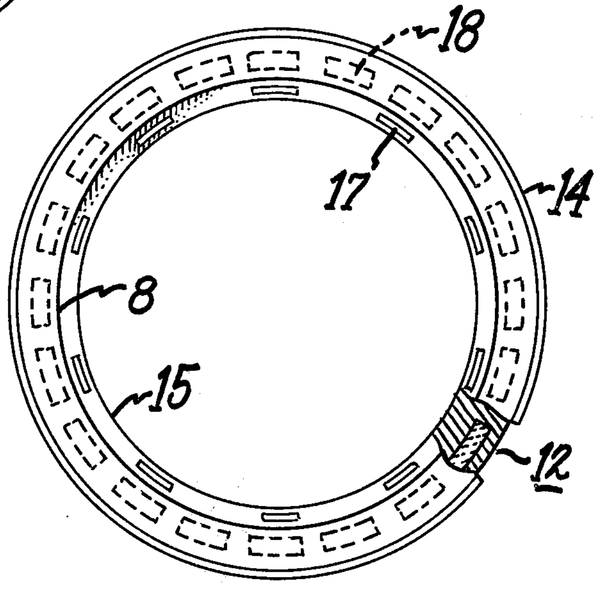
PRIOR ART Fig.6.
FIG. 6 is a plan view of the shield support ring of FIG. 5 sealed within a vacuum interrupter envelope.
Figure 5:
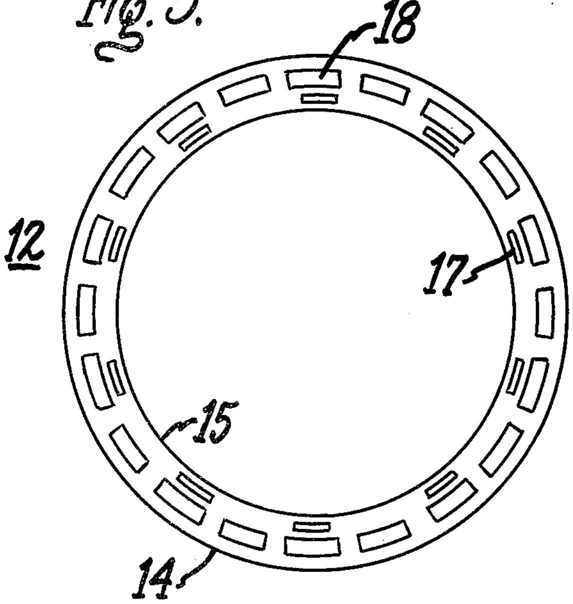
FIG. 5 is a plan view of a shield support ring according to the invention.

The shield support ring 12 according to the invention can be seen by referring to FIG. 5. A plurality of quasi rectangular slots 18 are provided proximate to the outer perimeter 14 to provide for the passage of molten glass during the envelope forming process. The inventive support ring 12 within the glass envelope 10 is shown in FIG. 6. The rectangular slots 17 extend within the inner surface 8 of glass envelope 10 and provide the same functions as described for the prior art embodiment of FIG. 3. The outer perimeter 14 of ring 12 extends exterior to glass envelope 10 and the plurality of quasi rectangular slots 18 are completely embedded within the envelope. FIG. 7 shows an enlarged view of one quasi rectangular slot 18 completely encapsulated within glass envelope 10 wherein outer ring perimeter 14 and inner ring perimeter 15 are outside the glass material. The thickness S of ring 12 is the same as for the prior art embodiment of FIG. 4 and the shield support slots 17 are similar in size and number to those described earlier for the embodiment of FIG. 4. The length L and width W for the quasi rectangular slot 18 are critical in both design and number for the following reasons. In an attempt to design an opening for the transfer of molten glass during the glass envelope forming process the opening must be sufficient in size to allow for the transport of molten glass and yet become completely embedded within the glass during the glass casting operation. This was not feasible for the prior art configuration of FIG. 4 since a circular opening of diameter D would require a substantial quantity of glass to completely extend over the entire diameter. The excess quantity of glass was found to interfere with subsequent vacuum interrupter construction. As discussed earlier, attempts to reduce the diameter D resulted in an insufficient rate of flow of glass being transferred through the smaller diameters thereby causing sealing problems. Attempts to increase the number of apertures 16 of a reduced diameter were also unsuccessful since the viscosity of the molten glass prevented its complete passage through the smaller diameter openings during centerfuging. Also the colder glass subsequently delivered to the top flange 11 (FIG. 1) did not adequately bond to it.

Considering the total cross sectional area of the plurality of slots 18, in FIG. 7, to constitute a "port" size for the transport of molten glass, the total port dimension was found to be equal to or greater than the port provided by the plurality of apertures 16 for the embodiment of FIG. 4 in order to produce good vacuum switch seals. Earlier test data indicates that the poor seals result between the support ring and the glass envelope when the port opening is too small for a sufficiently rapid transfer of molten glass. Good seals are achieved when the aperture diameter D (FIG. 4) is in the order of 0.406" and when 45 of the apertures 16 are equidistantly located around the perimeter of ring 12. In order to ensure that the critical width W of quasi rectangular slot 18 (FIG. 7) is less than the diameter D (FIG. 4) a plurality of slots of varying lengths L were formed for a corresponding plurality of rings 12 having a width S equal to approximately one half of diameter D. Good seals resulted when the quasi rectangular slot 18 was provided with a width W equal to approximately 0.233" and for slot lengths L ranging from 0.900" to 1.25". For a slot configuration having a width W equal to 0.233" and a length L equal to 0.942" twenty slots 18 provided a port area equivalent to 45 apertures 16 having a diameter D equal to 0.406". The range in the slot thickness W was effective from 0.200" up to approximately 0.300" before it became difficult to completely encapsulate the slots within the glass envelope 10.

In order to further promote the transfer of molten glass through slot 18 a slight radius r was provided to each side. For the configuration shown in FIG. 7 wherein width W equals 0.233" and length L equals 0.942", a radius r equal to 0.125" was sufficient. High voltage vacuum interrupters manufactured from envelopes containing the shield support ring of the invention as shown in FIGS. 5, 6, and 7 were found to have superior operating characteristics since the principle source of contamination was effectively eliminated.

In order to ensure that slot 18 of FIG. 7 is completely embedded within glass envelope 10 the width W, defined herein as the minor dimension, must be equal to or less than ½ the glass envelope thickness G. Since the configuration 18 of FIG. 7 defines a quasi rectangular geometry, length L corresponds to the major dimension of the rectangle. In order to determine whether other configurations for slot 18 would be operable in vacuum switch devices a variety of geometric configurations were investigated wherein the major and minor dimensions were varied. The factor of merit for each configuration employed was both the number of good seals that could be provided between ring 12 and envelope 10 as well as the absence of glass contamination in the finished vacuum switch.

FIG. 8 shows the relative number of good vacuum switches 5 manufactured as a function of the ratio of the minor to major dimensions for the slot 18 of FIG. 7. When the minor dimension was small relative to the major dimension, for a ratio of minor to major dimension less than three to eight, the molten glass was cooled due to the reduced rate of flow through the slots. As a result of the lessened glass flow the vacuum switch enclosures exhibited poor seals between the flange 11, shield support ring 12 and glass envelope 10. For dimensions wherein the ratio of the minor to major dimension was greater than approximately three to four slot 18 was not completely embedded within glass envelope 10 and glass contamination occurred within the finished vacuum device. Optimum vacuum switch devices having both the least number of seal failures and the least amount of glass contamination occurred when the minor dimension was roughly one half the major dimension and when the minor dimension was roughly one half the envelope wall thickness.

FIG. 9B shows an elliptical configuration 20 wherein the minor dimension h is the "width" of the ellipse the major dimension a is the "length" of the ellipse. A rectangular configuration 19 is also shown in FIG. 9A. As discussed earlier, width W comprises the minor dimension of rectangle 19 and length L defines the major dimension. Comparing the ellipse 20 to the rectangle 19, for glass encapsulating properties, it is believed that the absence of sharp corners in the ellipse 20 provides better glass transfer during the casting process and results in less strain in the formed vacuum switch enclosure.

Although the vacuum switch shield support ring of the invention is described for use within high voltage vacuum interrupters, this is by way of example only. The shield support ring of the invention finds application wherever high vacuum devices containing the inventive ring configuration may be required.

We claim:

1. An improved shield support ring for vacuum switch enclosures of the type consisting of a glass envelope containing a shield support ring having a plurality of passages through the ring for the transport of molten glass during the glass forming process, the improvement which comprises:

the passages of said shield support ring having a minor and major dimension wherein the minor dimension is less than the major dimension for providing encapsulation of the passages within the glass envelope.

2. The improved shield support ring of claim 1 wherein the passages define a quasi rectangular configuration.

3. The improved shield support ring of claim 1 wherein the passages define an elliptical configuration.

4. The improved shield support ring of claim 1 wherein the minor dimension is equal to or less than ½ the envelope thickness.

5. The improved shield support ring of claim 1 wherein the passages are completely embedded within the glass envelope for reducing contamination within the vacuum switch.

6. The improved shield support ring of claim 1 wherein the ratio of the minor to major dimension ranges from three to eight to three to four.

7. An improved vacuum switch enclosure of the type consisting of a perforated shield support ring sealed within a glass envelope of a predetermined thickness and a pair of metal sealing flanges at either end of the envelope the improvement which comprises:

the perforated metal support ring having a plurality of passages through the ring for the transfer of molten glass during the glass forming process each passage defining a minor and a major dimension wherein the major dimension is less than the major dimension for ensuring that the passages are completely embedded within the glass envelope.

8. The improved vacuum switch enclosure of claim 7 wherein the passages define a quasi rectangular configuration.

9. The improved vacuum switch enclosure of claim 7 wherein the passages define an elliptical configuration.

10. The improved vacuum switch enclosure of claim 7 wherein the ratio of the minor to the major dimension is from 3 to 8 to 3 to 4.

11. The improved vacuum switch enclosure of claim 7 wherein the minor dimension is equal to or less than ½ the envelope thickness.

12. An improved method for forming a vacuum switch enclosure of the type consisting of centrifugally casting molten glass within a mold wherein the molten glass passes through perforations of a shield support ring for embedding the shield support ring within a glass envelope the improvement which comprises:

providing a minor and major dimension to the perforations wherein the minor dimension is less than the major dimension, and completely encapsulating the perforations within the glass envelope to prevent glass contamination from occurring when the vacuum switch envelope is processed into a vacuum switch device.

13. The method of claim 12 wherein the ratio of the minor to major dimension ranges from 3 to 8 to 3 to 4.

* * * * *